(12) United States Patent
Liepold

(10) Patent No.: US 6,252,209 B1
(45) Date of Patent: Jun. 26, 2001

(54) ADAPTIVE TEMPERATURE CONTROL CIRCUIT WITH PWM OUTPUT

(75) Inventor: Carl F. Liepold, Chandler, AZ (US)

(73) Assignee: Andigilog, Inc., Chandler, AZ (US)

( * ) Notice: Subject to any disclaimer, the term of this patent is extended or adjusted under 35 U.S.C. 154(b) by 0 days.

(21) Appl. No.: 09/234,587

(22) Filed: Jan. 21, 1999

(51) Int. Cl.$^7$ .................................................. H05B 1/02
(52) U.S. Cl. ............................................ 219/501; 219/504
(58) Field of Search ..................................... 219/500, 501, 219/488, 490; 99/325; 165/200; 323/234

(56) References Cited

U.S. PATENT DOCUMENTS

| | | | |
|---|---|---|---|
| 4,162,379 | 7/1979 | Sebens et al. ......................... | 219/497 |
| 4,495,405 | 1/1985 | Foster .................................... | 219/510 |
| 4,506,143 | * 3/1985 | Telis et al. ........................... | 219/497 |
| 4,604,517 | * 8/1986 | Barry .................................... | 219/494 |
| 4,799,176 | * 1/1989 | Cacciatore ........................... | 364/557 |
| 5,253,564 | * 10/1993 | Rosenbrock et al. ................ | 99/328 |
| 5,448,147 | * 9/1995 | Kasai .................................. | 318/568.17 |
| 5,618,460 | * 4/1997 | Fowler et al. ....................... | 219/497 |
| 5,793,022 | 9/1998 | Klinck et al. ........................ | 219/483 |
| 5,847,367 | * 12/1998 | Hancock et al. .................... | 219/499 |

OTHER PUBLICATIONS

Specification sheet for Analog Devices ADM9240 system hardware monitor, pp. 1–19; ©1998.
National Semiconductor's Temperature Sensor Handbook, pp. 1–40, ©1995.

* cited by examiner

*Primary Examiner*—Teresa Walberg
*Assistant Examiner*—Daniel Robinson
(74) *Attorney, Agent, or Firm*—Paul F. Wille

(57) ABSTRACT

An adaptive temperature control circuit includes a first circuit for producing an error signal representing the difference between a preset temperature and an actual temperature and a second circuit coupled to the first circuit for producing a pulse width modulated output signal having a frequency greater than one hertz, wherein the width of the pulses is proportional to the error signal.

9 Claims, 4 Drawing Sheets

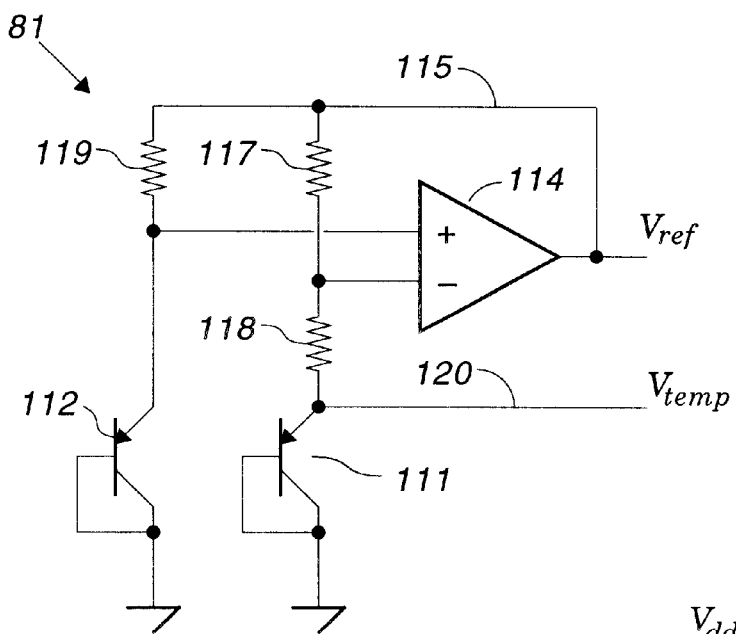
FIG. 7
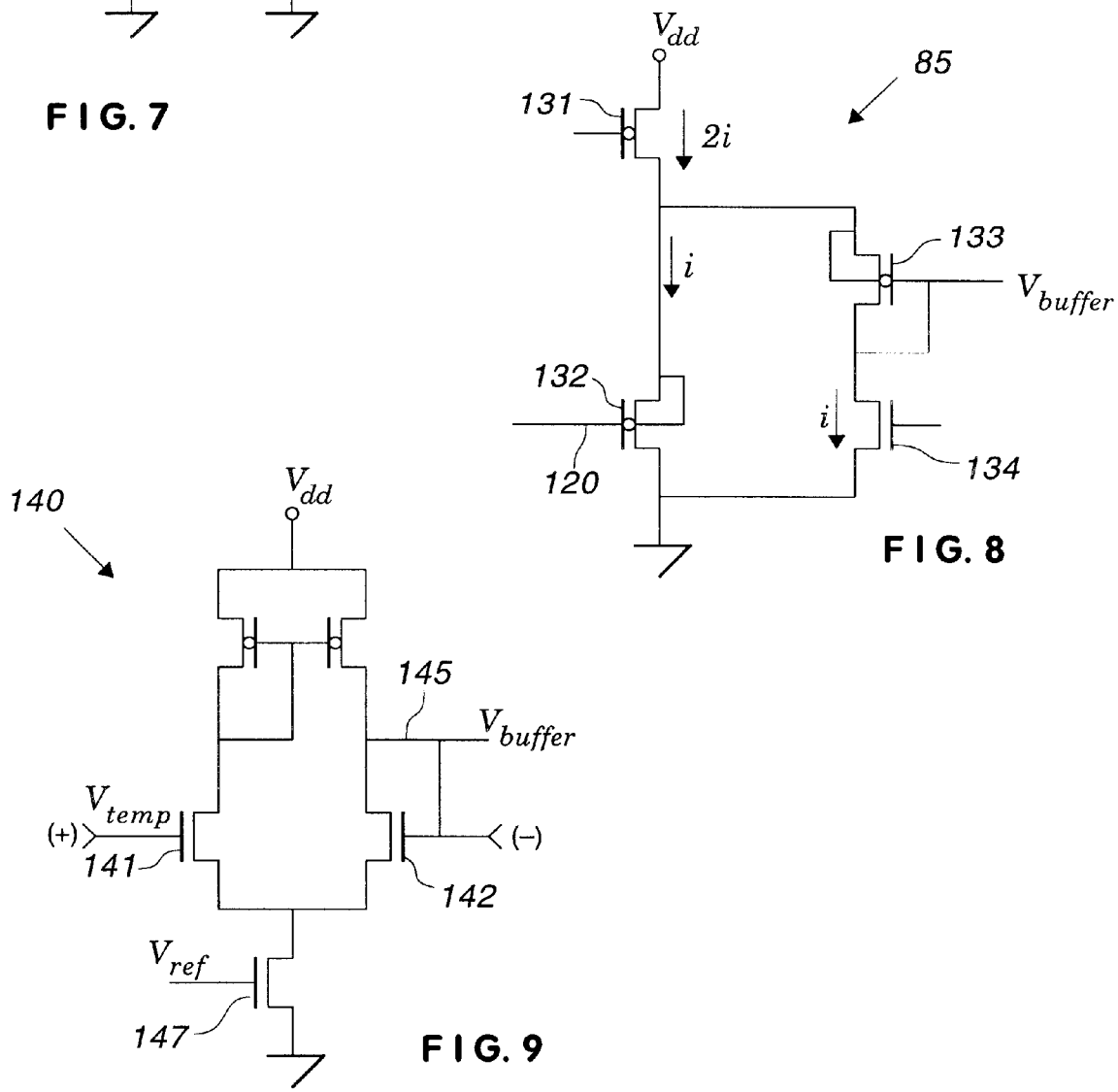
FIG. 8
FIG. 9

ADAPTIVE TEMPERATURE CONTROL CIRCUIT WITH PWM OUTPUT

BACKGROUND OF THE INVENTION

This invention relates to closed loop temperature control and, in particular, to an easily calibrated temperature sensing and control circuit for continuously controlling the temperature of a system in real time without hysteresis.

Temperature control circuits are legion and are encountered daily. The typical home heating system includes a temperature sensor and a switch for turning a heater on or off. The cycling of the heater is a kind of hysteresis that enables one to provide a relatively low cost control circuit. Specifically, the temperature is maintained within a range by turning the heater on until a maximum temperature is reached and then turning the heater off until the temperature drops to a predetermined minimum. The system oscillates between the two boundaries.

For many applications, even commercial processes, such a control is entirely adequate. For other applications, a more precise control is necessary. It is known in the art to provide proportional control; e.g. U.S. Pat. No. 4,495,405 (Foster). Although the Foster patent describes a circuit as providing proportional control, the output signal to a heater turns the heater on and off at a very low frequency, below one hertz, because the output signal tracks temperature variations in the system.

U.S. Pat. No. 4,162,379 (Sebens et al.) describes a heater control circuit that continuously monitors the power applied to a heating element. Variations in the resistance of the heater element, due to temperature, aging, or other causes, are compensated by the feedback network. Systematic errors are also compensated.

U.S. Pat. No. 5,793,022 (Klinck et al.) discloses an adaptive temperature controller in which the gain and the time constant of the controller are variables that are calculated during the control process. The Klinck et al. patent, in effect, addresses the problem of calibration by making certain parameters variables. It is preferred to provide a simpler control circuit that is easily calibrated.

Many of the precise temperature control circuits of the prior art are relatively complex, not amenable to integration on a single chip, which makes the circuits expensive. Similarly, many of the precise temperature control circuits of the prior art are adapted for a particular application, in part due to the thermal inertia of the systems for which they were designed.

In view of the foregoing, it is therefore an object of the invention to provide an adaptive temperature control circuit in which the output signal is pulse width modulated at a high frequency.

Another object of the invention is to provide an adaptive temperature control circuit that can be implemented as a single integrated circuit.

A further object of the invention is to provide an adaptive temperature control circuit that can interface directly with a microprocessor for setting temperature.

Another object of the invention is to provide an adaptive temperature control circuit that can easily be calibrated.

A further object of the invention is to provide an adaptive temperature control circuit for which the voltage versus temperature curve is easily adjusted over a wide range of slopes.

Another object of the invention is to provide an adaptive temperature control circuit that can be used with systems of widely different response times.

SUMMARY OF THE INVENTION

The foregoing objects are achieved in this invention in which an adaptive temperature control circuit includes a first circuit for producing an error signal representing the difference between a preset temperature and an actual temperature and a second circuit coupled to the first circuit for producing a pulse width modulated output signal having a frequency greater than one hertz, wherein the width of the pulses is proportional to the error signal.

BRIEF DESCRIPTION OF THE DRAWINGS

A more complete understanding of the invention can be obtained by considering the following detailed description in conjunction with the accompanying drawings, in which:

FIG. 7 is a schematic of contents of the bandgap block in FIG. 5;

FIG. 8 is a schematic of contents of the voltage buffer block in FIG. 5; and

FIG. 9 is a schematic of an alternative embodiment of a voltage buffer.

DETAILED DESCRIPTION OF THE INVENTION

Figure 1:
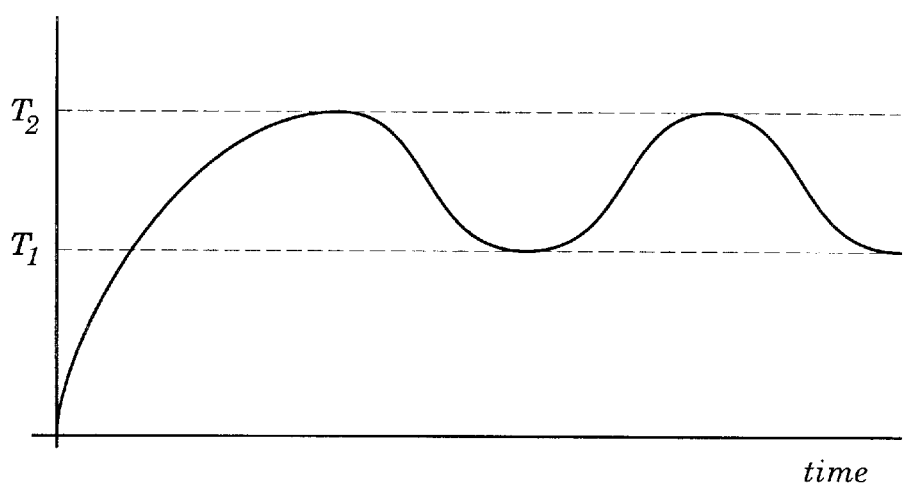
FIG. 1 is a chart of the temperature versus time characteristic of a control circuit of the prior art.

Any control system employing feedback runs the risk of oscillating unintentionally due to the inertia or response time of the controlled system. In a temperature controlled oven, for example, the type and location of the heaters and the location of the temperature sensor affect the response time of the system. In the prior art, the problem has been addressed as illustrated in FIG. 1 by the use of hysteresis. Specifically, power is applied until an upper limit, $T_2$, is reached, then power is removed until a lower limit, $T_1$, is reached. The difference between $T_1$ and $T_2$ can be made arbitrarily small but the problem remains that the temperature is oscillating, albeit in a controlled fashion.

Figure 2:
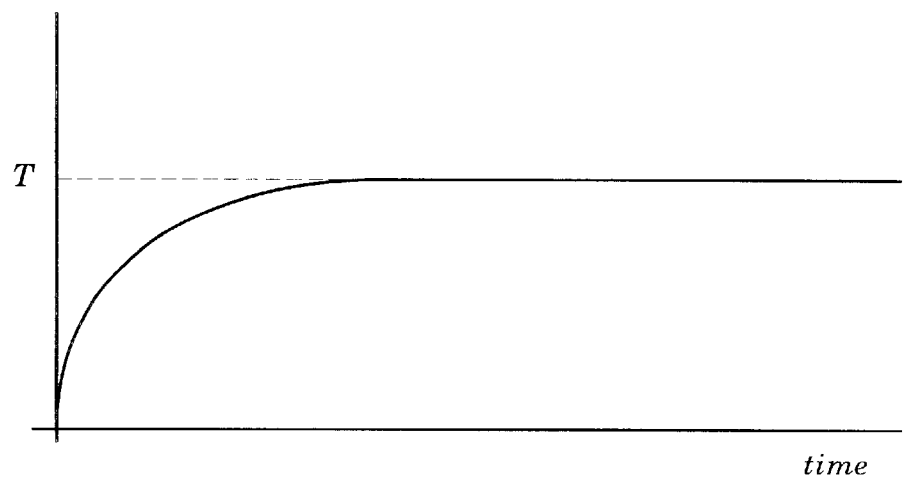
FIG. 2 is a chart of the temperature versus time characteristic of a control circuit operating in accordance with the invention.

The operation of an adaptive control system is illustrated in FIG. 2. In this type of control, the system is continuously monitored and is continuously adjusted to provide the desired temperature. This is somewhat like the system described in the patent to Klinck et al. The invention is a much simpler, and less expensive, circuit that achieves the same level of control.

Figure 3:
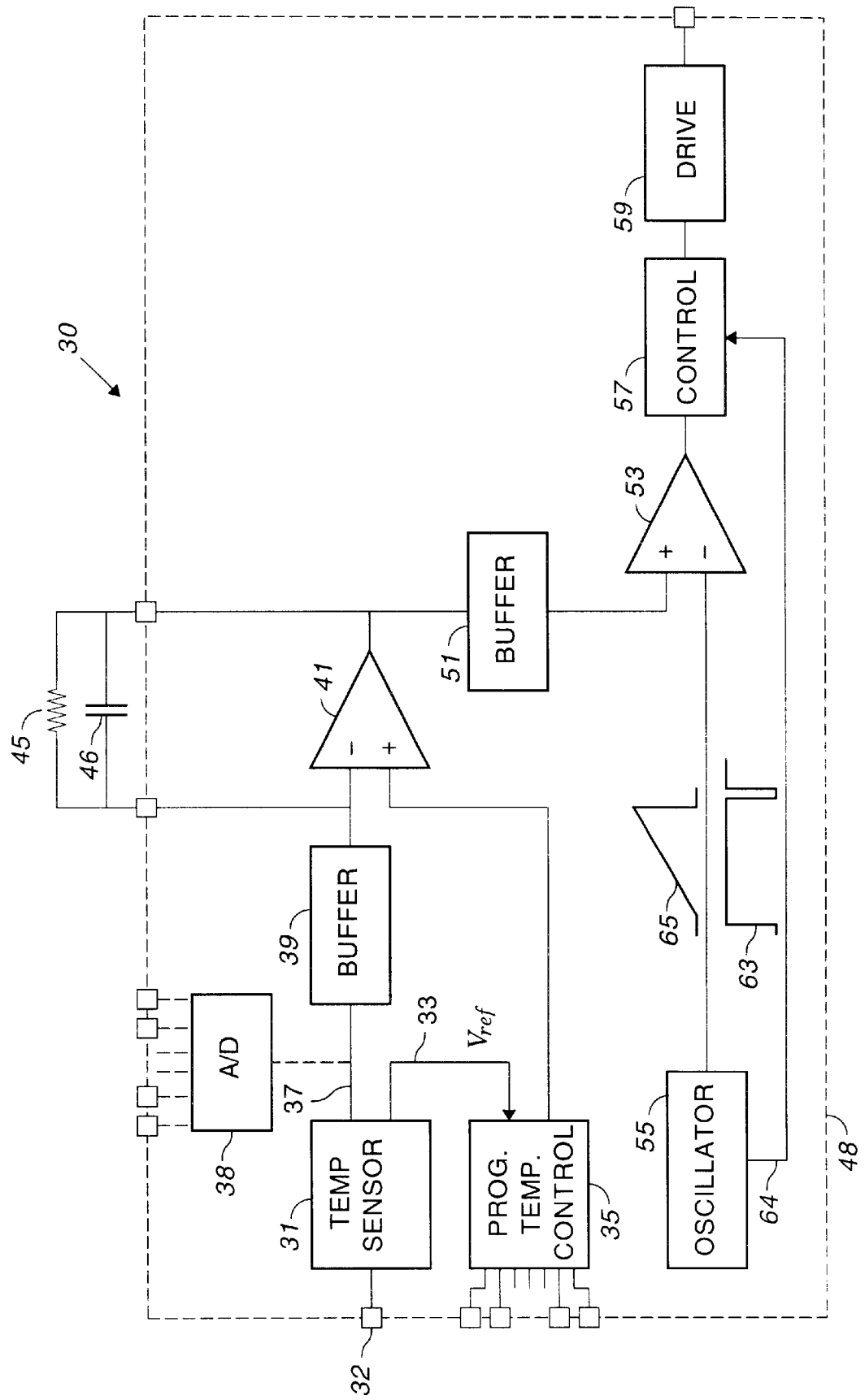
FIG. 3 is a schematic of a control circuit constructed in accordance with the invention.

FIG. 3 illustrates a preferred embodiment of the invention. Adaptive control circuit 30 includes temperature sensor 31 having input 32 coupled to a source (not shown) of voltage. An internally generated reference voltage is coupled by way of output 33 to programmable temperature control 35. Output 37 of temperature sensor 31 is coupled to buffer 39, which isolates temperature sensor 31 from amplifier 41. Amplifier 41 is a differential amplifier having an inverting input coupled to buffer 39 and a non-inverting input coupled to output 43 of control 35.

Programmable temperature control 35 is a digital to analog (D/A) converter that can be coupled to a microprocessor (not shown) or to fixed logic (not shown), such as a shift register, for producing a voltage proportional to a digital representation of temperature. This voltage is a precise fraction of the reference voltage received from temperature sensor 31. Amplifier 41 compares the voltage from programmable temperature control 35 with the voltage from temperature sensor 31 to produce an error signal.

The error signal is coupled by buffer 51 to the non-inverting input of comparator 53. The inverting input of comparator 53 is coupled to oscillator 55. One output of oscillator 55 is a sawtooth waveform, which is coupled to the inverting input of comparator 53. Variations in the amplitude of the error signal will cause variations in the time at which the input signals are equal, as illustrated in FIG. 4.

Figure 4:
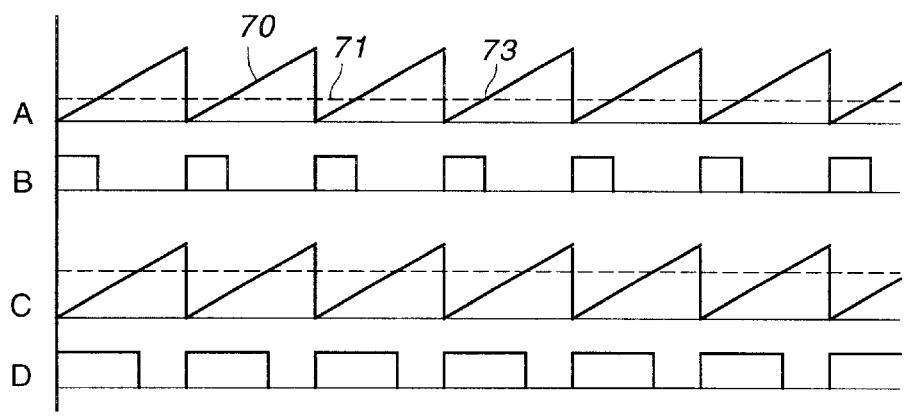
FIG. 4 is a chart of waveforms illustrating a portion of the operation of the invention.

In FIG. 4, sawtooth 70 and error signal 71 have the same amplitude at point 73. As the relative magnitudes of the signals changes, the output of comparator 53 (FIG. 3) changes state, producing pulses as indicated in waveform B. If the magnitude of the error signal is large, as indicated in waveform C, then the time at which the comparator changes state occurs later, as indicated by waveform D, wherein the pulses have a longer duty cycle.

Thus, returning to FIG. 3, comparator 53 produces a pulse width modulated output signal having a frequency determined by oscillator 44 and a pulse width determined by the magnitude and sign of the error signal from buffer 51. The output from comparator 53 is coupled to control circuit 57 to driver 59. Driver 59 provides sufficient current for driving at least one external power transistor for controlling an external device, such as a heater or a motor, e.g. for a fan.

The period of sawtooth waveform 65 is much shorter than the response time of the system being controlled. For example, in an oven having a plurality of incandescent heat lamps, the time between turning on the lamps and sensing the temperature change of an object in the oven might be one or two seconds, corresponding to a frequency of less than one hertz. The frequency of sawtooth waveform 65 is greater than one hertz, preferably on the order of kilohertz, corresponding to a period of milliseconds. Thus, the pulse width modulated output signal is essentially analog and continuous, being smoothed or averaged by the device being controlled. The power to a heat lamp might be turned on and off but the lamp does not turn on and off because of the thermal inertial of the filament. Instead, the lamp dims.

Control circuit 57 provides a limiting function by comparing the output signal of comparator 53 with pulse signal 63 from oscillator 55 on output 64. Pulse signal 63 is synchronized with sawtooth waveform 65, i.e. the signals begin each cycle at the same time. Pulse signal 63 preferably has a large duty cycle, e.g. ninety percent, and acts as an enabling signal to control 57. Thus, the maximum duty cycle of the signal applied to drive 59 is determined by the duty cycle of pulse 63. In normal operation, pulse 63 has no effect because the duty cycle of the pulses from comparator 53 are less than the maximum.

Amplifier 41 also acts as a control loop filter, giving the loop a time constant that is preferably equal to or greater than the response time of the system being controlled; e.g., the time necessary to sense a temperature change after heat is first applied to a system. Thus, the system is damped and oscillations will not occur.

In FIG. 3, the loop filter includes amplifier 41 and a low pass filter including resistor 45 and capacitor 46 coupling the output of the amplifier to an inverting input of the comparator. Resistor 45 and capacitor 46 are external to integrated circuit, represented by dashed line 48, incorporating most of control circuit 30, including the temperature sensor, in order to provide a control circuit that is adjustable over a wide range of time constants, making the circuit adaptable to a wide range of control applications without re-design.

Figure 5:
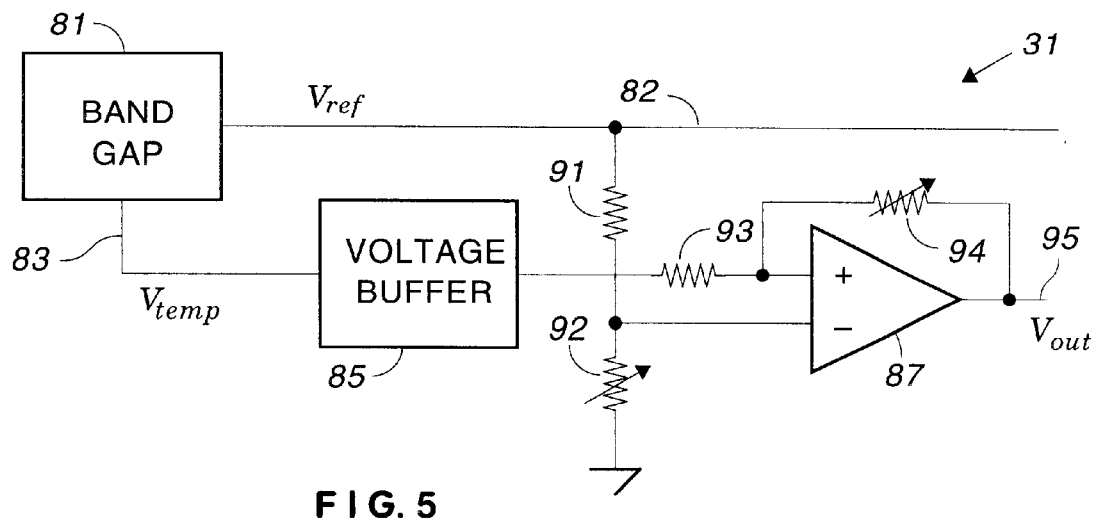
FIG. 5 is a schematic of contents of the temperature sensor block in FIG. 3.

FIG. 5 illustrates a temperature sensor suitable for use in block 31 (FIG. 3). Bandgap 81 includes at least one PN junction subject to temperature variations for causing a variable output voltage. A reference voltage used in bandgap 81 is brought out on line 82 for use by other circuitry. The voltage indicative of temperature is coupled from output 83 of bandgap 81 to voltage buffer 85. Voltage buffer 85, described in conjunction with FIG. 7, provides a high impedance load for bandgap 81, thereby avoiding affecting the measurement.

The output of voltage buffer 85 is proportional to, and preferably equal to, the signal from bandgap 81. Operational amplifier 87 has one input coupled through resistor 88 to the output of voltage buffer 85 and a second input coupled to the junction of resistor 91 and potentiometer 92, which are coupled in series between the reference voltage on line 82 and common.

Potentiometer 94 is coupled between the output and the first input of operational amplifier 87. The ratio of potentiometer 94 to resistor 88 determines the gain of the amplifier. The voltage drop across potentiometer 92 determines the offset voltage to amplifier 87. Potentiometers 92 and 94 provide a simple, low cost mechanism for adjusting the gain of the control loop, by way of potentiometer 94, and the offset voltage, by way of potentiometer 92.

Figure 6:
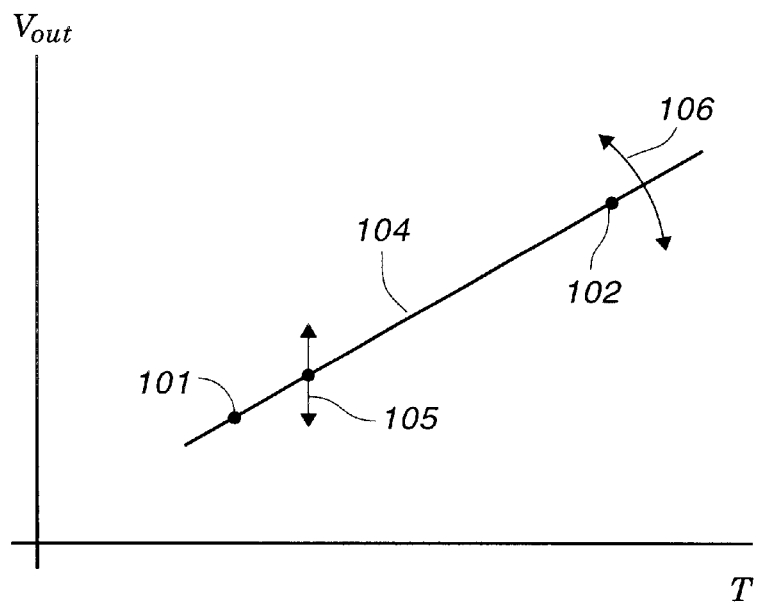
FIG. 6 is a chart of output voltage versus temperature for a control circuit constructed in accordance with the invention.

The effect of adjusting the two potentiometers is illustrated in FIG. 6, which illustrates response curve 101 of a temperature sensor constructed in accordance with the invention. The slope of the response curve, and the feedback to the loop filter, affect the response of control circuit 30 (FIG. 3). To calibrate the circuit, one need only make two measurements, represented by points 101 and 102, and then adjust offset and gain to obtain the desired response. The offset, indicated by double ended arrow 105, effects vertical translation without rotation of line 101. The gain effects rotation, without translation, of line 101, as indicated by double ended arrow 106. Thus, the response curve of the temperature sensor can be adjusted, within reason, to intersect any two points in the V-T plane.

In FIG. 3, control circuit 30 optionally includes analog to digital (A/D) converter 38 for providing a digital representation of the temperature as sensed. The output of temperature sensor 31 is buffered and has sufficient capacity to drive converter 38 and buffer 39. Converter 38 could be coupled to the output of buffer 39, amplifier 41, or buffer 51 instead.

FIG. 7 is a schematic of a circuit suitable for use in block 81 (FIG. 5). Transistors 111 and 112 are diode connected, i.e. the base of each transistor is connected to the collector of the respective transistor, forming PN junctions that are used for measuring temperature. A constant current is provided through the junctions and variations in temperature cause variations in the voltage drop across the junctions. The junctions can have equal areas or have unequal areas.

Amplifier 114 provides a reference voltage on rail 115 that is coupled to transistor 111 through resistors 117 and 118 and is coupled to transistor 112 through resistor 119. Resistors 117 and 119 can be matched or have different values. Resistor 118 provides an offset between the voltages applied to the inputs of amplifier 114 and this offset remains relatively constant. The emitter of either transistor 111 or 112 can be used as the output terminal for the circuit. In FIG. 7, output 120 is coupled to the emitter of transistor 111.

Feedback through amplifier 114 provides a constant current through the transistors. Changes in temperature cause changes in the voltage drops across transistors 111 and 112 and the difference between the voltage on the emitter of transistor 112 and the voltage at the junction of resistors 117 and 118 is used to adjust the voltage on rail 115 to maintain a substantially constant current through the transistors.

FIG. 8 is a schematic of one type of circuit suitable for use in block 85 (FIG. 5). Voltage buffer 85 includes PMOS transistors 131 and 132 connected in series between voltage source Vdd and common. Transistors 133 and 134 are connected in series with each other and in parallel with transistor 132. The source and gate of transistor 133 are connected together, causing the gate voltage of transistor 133 to track the voltage drop across transistor 134. Transistors 132 and 133 are matched devices, i.e. their electrical characteristics are the same to within a small tolerance.

Transistor 131 is biased to produce a current (2i) through the transistor. This current divides between transistor 132 and transistors 133, 134. Transistor 134 is biased to pass a current equal to i, thereby forcing a current of i through transistor 132. Thus configured and biased, variations in the voltage on the gate of transistor 132 cause corresponding variations on the gate of transistor 133. The gate of transistor 132 provides a very high impedance load to output 120, thereby not affecting the measurement of temperature.

FIG. 9 is a schematic of another type of circuit that can be used for voltage buffer 85. Buffer 140 is a differential amplifier having non-inverting input transistor 141 and inverting input transistor 142. The gate of transistor 142 is coupled to output 145. Transistor 147 provides a common, constant current path to ground. The gate of transistor 141 provides a very high impedance load to output 120 (FIG. 7), thereby not affecting the measurement of temperature. Buffer 140 could also be represented schematically by the same symbol used for amplifier 114 in FIG. 7, with the output coupled to the (−) input.

The invention thus provides an adaptive temperature control circuit in which the output signal is pulse width modulated at a high frequency. The circuit can be implemented as a single integrated circuit and can interface directly with a microprocessor for setting temperature. The circuit is easily calibrated and the voltage versus temperature curve is easily adjusted over a wide range of slopes, enabling the circuit to be used with systems of widely different response times.

Having thus described the invention, it will be apparent to those of skill in the art that various modifications can be made within the scope of the invention. For example, the low pass filter around amplifier 41 can include discrete, passive devices in a simple circuit, as illustrated, or a more complex low pass filter. For example, resistor 45 can be implemented as a circuit simulating a resistor and capacitor 46 can be replaced by a switched capacitor circuit. In either case, the feedback loop becomes programmable, which is useful in many applications. Other circuits can be substituted for the circuits illustrated in FIGS. 7 and 8.

What is claimed as the invention is:

1. An adaptive temperature control circuit comprising:
  a first circuit for producing an error signal representing the difference between a preset temperature and an actual temperature, said first circuit including a pair of PN junctions and a constant current source coupled to a first PN junction for regulating the current through a second PN junction; and
  a second circuit coupled to said first circuit for producing a pulse width modulated output signal having a frequency greater than one hertz, wherein the width of the pulses is proportional to said error signal.

2. The adaptive temperature control circuit as set forth in claim 1 wherein at least said PN junctions and said second circuit are implemented on the same semiconductor die.

3. The adaptive temperature control circuit as set forth in claim 1 wherein said first circuit includes an A/D converter for providing a digital representation of temperature.

4. The adaptive temperature control circuit as set forth in claim 1 wherein said first circuit includes:
  a temperature sensor producing a first signal;
  a D/A converter producing a second signal indicative of a preset temperature;
  a comparator having a first input coupled to said temperature sensor and a second input coupled to said D/A converter, said comparator producing said error signal.

5. The adaptive temperature control circuit as set forth in claim 4 wherein said second circuit includes:
  an oscillator producing a sawtooth signal;
  an amplifier having a first input coupled to said oscillator for receiving said sawtooth signal and a second input coupled to said comparator, said amplifier producing an output signal that changes state when the sawtooth signal is equal in magnitude to the error signal, thereby producing said pulse width modulated output signal.

6. The adaptive temperature control circuit as set forth in claim 5 wherein said second circuit further includes a control circuit coupled to said amplifier for limiting the pulse width of said pulse width modulated output signal.

7. The adaptive temperature control circuit as set forth in claim 1 wherein said first circuit includes:
  a voltage buffer having an input coupled to said junction and an output, said voltage buffer producing a signal indicative of the temperature of said second PN junction on said output;
  a source of reference voltage;
  a first resistor and a second resistor coupled in series between said source and common and having a junction therebetween;
  an operational amplifier having a first input coupled to the output of said voltage buffer and a second input coupled to said junction;
  a third resistor coupled between an output of said operational amplifier and said first input;
  wherein said second resistor is variable and controls an offset voltage and said third resistor is variable and controls the gain of said operational amplifier.

8. Apparatus for producing an electrical error signal representing the difference between a preset temperature and an actual temperature, said apparatus comprising:
  at least one PN junction;
  a voltage buffer having an input coupled to said junction and an output, said buffer circuit producing a signal indicative of the temperature of said PN junction on said output;
  a source of reference voltage;
  a first resistor and a second resistor coupled in series between said source and common and having a junction therebetween;
  an operational amplifier having a first input coupled to the output of said voltage buffer and a second input coupled to said junction;

a third resistor coupled between an output of said operational amplifier and said first input;

wherein said second resistor is variable and controls an offset voltage and said third resistor is variable and controls the gain of said operational amplifier.

9. The apparatus as set forth in claim 8, wherein said voltage buffer includes:

a first transistor having an input terminal coupled to said junction, a second transistor coupled to said operational amplifier, and a third transistor, wherein the first transistor and the second transistor are coupled in parallel with each other and in series with the third transistor;

said third transistor limiting the sum of the currents through the first transistor and the second transistor and causing changes in the input voltage to the first transistor to be reflected as changes in the voltage drop across the second transistor, whereby the voltage on said junction is isolated from said operational amplifier.

\* \* \* \* \*